United States Patent [19]

Epstein

[11] Patent Number: 5,112,908

[45] Date of Patent: May 12, 1992

[54] TOUGH POLYAMIDE COMPOSITIONS HAVING HIGH MELT FLOW FOR COMPLEX MOLDINGS

[75] Inventor: Bennett N. Epstein, Wilmington, Del.

[73] Assignee: E. I. Du Pont de Nemours and Company, Wilmington, Del.

[21] Appl. No.: 489,774

[22] Filed: Mar. 5, 1990

Related U.S. Application Data

[63] Continuation of Ser. No. 945,518, Dec. 23, 1986, abandoned.

[51] Int. Cl.$^5$ .............................................. C08L 77/00
[52] U.S. Cl. ...................................... 525/66; 525/179; 525/182; 525/183; 525/184; 524/504; 524/514
[58] Field of Search ................. 525/66, 179, 183, 182, 525/184

[56] References Cited

U.S. PATENT DOCUMENTS

| | | | |
|---|---|---|---|
| 2,071,250 | 7/1931 | Carothers | 260/106 |
| 2,130,523 | 9/1938 | Carothers | 260/129 |
| 2,130,948 | 9/1838 | Carothers | 18/59 |
| 3,963,799 | 6/1976 | Starkweather | 525/184 |
| 4,062,819 | 12/1977 | Mains | 260/18 |
| 4,080,349 | 3/1978 | Wurmb et al. | 260/28 |
| 4,167,505 | 9/1979 | Dunkeberger | 260/37 |
| 4,174,358 | 11/1979 | Epstein | 525/183 |
| 4,181,775 | 1/1980 | Corke | 428/348 |
| 4,247,665 | 1/1981 | Daniels et al. | 525/66 |
| 4,306,040 | 12/1981 | Baer | 525/310 |
| 4,320,213 | 3/1982 | Woodbrey et al. | 525/179 |
| 4,339,376 | 9/1982 | Kasahara | 524/116 |
| 4,350,794 | 9/1982 | Moncur | 525/183 |
| 4,375,532 | 3/1983 | Baer | 525/310 |
| 4,448,934 | 5/1989 | Weaver | 525/189 |
| 4,474,427 | 10/1984 | Novak | 525/66 |
| 4,485,214 | 11/1984 | Ochiai | 525/179 |
| 4,511,684 | 4/1985 | Schmid | 524/101 |
| 4,544,702 | 10/1985 | DeVera | 525/66 |
| 4,554,320 | 11/1985 | Reimann et al. | 525/183 |
| 4,559,262 | 12/1985 | Coswell et al. | 428/401 |
| 4,584,344 | 9/1986 | Baer | 525/66 |
| 4,594,386 | 6/1986 | Olivier | 525/66 |

FOREIGN PATENT DOCUMENTS

| | | |
|---|---|---|
| 584205 | 11/1986 | Australia . |
| 0034704 | 9/1981 | European Pat. Off. . |
| 56703 | 7/1982 | European Pat. Off. . |
| 0156523 | 10/1985 | European Pat. Off. . |
| 2580656 | 10/1986 | France . |
| 57-18756 | 1/1982 | Japan . |
| 61-179258 | 8/1986 | Japan . |
| 998439 | 7/1965 | United Kingdom . |
| 2156364 | 10/1985 | United Kingdom . |

*Primary Examiner*—Ana L. Carrillo

[57] ABSTRACT

Tough, high melt flow, low molecular weight polyamide compositions containing toughening polymers are obtained by blending conventional polyamides with the toughening polymer and then mixing the blend with very low molecular weight polyamides which are capable of reacting with the conventional polyamide by transamidation.

19 Claims, No Drawings

TOUGH POLYAMIDE COMPOSITIONS HAVING HIGH MELT FLOW FOR COMPLEX MOLDINGS

This application is a continuation of application Ser. No. 06/945,518 filed Dec. 23, 1986, now abandoned.

FIELD OF THE INVENTION

This invention relates to thermoplastic polyamide compositions having high melt flow to facilitate flow into complex, thin molds, and which unexpectedly have good impact toughness; and to processes for preparing such compositions.

DESCRIPTION OF THE PRIOR ART

Thermoplastic polyamides have good elongation; high energy to break, as demonstrated in tensile tests; high tensile impact strength and high energy absorption as demonstrated in falling dart tests, e.g., the Gardner impact test. However, in one aspect of toughness, polyamides are quite deficient; namely, in resistance to crack propagation. This deficiency is reflected in notch sensitivity, brittle breaks and occasional catastrophic failure of molded or extruded parts. This tendency of polyamides to break in a brittle manner with crack propagation, rather than in a ductile fashion is a significant limitation on utility. Polyamides may be characterized in their brittleness by performance in the notched Izod test, ASTM D-256-56. With the normal notch radius of 10 mils, polyhexamethylene adipamide (66 nylon), dry as molded, will have a notched Izod value of about 1 ft. lb/inch of notch (53 joules/meter).

Recently, it was discovered that certain tougheners could be blended with polyamides of normal molecular weight, i.e., usually over 10,000, and normal melt flow, i.e., less than 200 gm/per 10 minutes and generally less than 100 gm per 10 minutes, to greatly improve resistance to crack propagation. This discovery is described in Epstein, U.S. Pat. No. 4,174,358. In this patent, polyamides having melt flows in the usual range of 0.01 to 200 grams per 10 minutes (at 280° C. and 2160 g load using ASTM D-1238) and having molecular weights of over 5,000 and usually over 10,000 (the lowest exemplified is 10,300) are melt blended with small particles of low tensile modulus copolymers that have adherent sites to obtain a highly toughened polyamide material.

There are applications where it is desirable to use polyamides of unusually high melt flow, i.e., flows of over 200 grams per 10 minutes, and having low molecular weights (which facilitate melt flow) i.e., below 8,000. Such applications include ones where molten polyamide must flow into very thin molds, such as, instrument consoles, pen barrels, etc. However, it is generally understood by those skilled in the art that linear aliphatic thermoplastic polyamides with molecular weights below 10,000 and melt viscosities below 1,000 poise (or melt flow above about 70 gm per 10 minutes or inherent viscosity below 1 dl/gm) are too brittle for ordinary use even though they have the advantage of better processability, and little attention has been directed to them in the industrial area and even in academic circles.

There have been a large number of patents published addressed to toughening conventional polyamides, i.e., ones of high molecular weight and low flow, for injection molding, and substantial advances have been made in toughness of these materials; however, very little attention has been paid to the equally important problem of providing polyamides that are not only tough, but which are also high flow materials that can be easily molded into large parts with complex shapes in thin sections and with long flow paths.

It is the object of this invention to provide toughened polyamides where the polyamide is a high melt flow, low molecular weight polyamide. It is another object of the invention to provide processes for obtaining such toughened polyamides.

SUMMARY OF THE INVENTION

The toughened polyamides of this invention are multiphase thermoplastic blends comprising:

a) 60–90 wt. %, preferably 70–90 wt. %, of a polyamide matrix wherein at least 50% (preferably 5%) of the polyamide matrix by weight is composed of aliphatic moieties, wherein the number average molecular weight of the polyamide(s) in the matrix is between 3,000 and 8,000, preferably 5,000, and b) complementally, 10–40 wt. %, preferably 10–30 wt. %, of at least one organic polymeric toughener having a tensile modulus below 10,000 psi or for a mixture of tougheners an average modulus below 10,000 psi, preferably below 5,000 psi and most preferably below 3,000 psi, for either the single toughener or the mixture, and having a number average particle size less than 1,000 nanometers, and preferably less than 500 nanometers, and wherein the blend has a notched Izod of over 2 ft. lbs/inch, and also has a tensile strength and melt flow such that the product of notched Izod in ft. lb/inch, tensile strength in thousands of pounds/in$^2$ and flow in grams/10 minutes is greater than 5,000, preferably greater than 10,000, and has 0.5–15 weight percent, preferably 1–7 weight percent, of the polyamide matrix grafted to or entrapped in the rubber.

The process of this invention comprises:

1. mixing a high molecular weight polyamide, or mixtures of such polyamides, having a number average molecular weight over 10,000, and having an inherent viscosity greater than 0.7 deciliters/gm, with an organic polymeric toughener having a tensile modulus below 10,000 psi or a mixture of tougheners having an average tensile modulus below 10,000 psi, preferably below 5,000 psi, and most preferably below 3,000 psi, and having graft sites, in a dispersing device at shear forces sufficient to disperse the toughener in the polyamide.

2. blending into the blend obtained in step 1 a low molecular weight polyamide which will react by transamidation, i.e., having a number average molecular weight below 5,000 and having an inherent viscosity less than 0.5, i.e., so that the number average molecular weight of the entire matrix is below 8,000.

The high and the low molecular weight polyamides are chosen such that in the matrix resulting from transamidation, at least 50% and preferably at least 75% of the polyamide matrix is composed of aliphatic moieties.

The low molecular weight polyamide is preferably chosen to have a sufficiently low molecular weight and sufficiently high combination of unbalanced ends and capped ends or sufficiently high end group imbalance to result, after reaction with the high molecular weight polyamide, in a polyamide matrix wherein the sum of the unbalanced ends and any capped ends is at least 200 equivalents per 10$^6$ grams of polyamide, or wherein the end group imbalance is at least about 1.9/1 or more and the sum of said ends is greater than 100. Such end group imbalance or a high concentration of unbalanced and capped ends is convenient in order for the polyamide matrix to be maintained at low molecular weight during the molding operation at the low moisture levels required to avoid surface imperfections (splay) at low molding pressures employed with the unreinforced compositions.

An advantage of the blends of this invention is that they can be molded at a fraction of the pressures needed to mold conventional higher molecular weight polyamides. Conventional polyamides generally have melt viscosities in the range of 100 to 1,000 Pascal seconds (i.e., melt flows of 5 to 70 grams/10 minutes) and injection pressures of over 1,000 psi are needed to force the polyamides into molds. This necessitates use of expensive specialized high pressure molding equipment. In contrast, the polyamide blends of this invention have melt viscosities between about 5 and 50 Pascal seconds (50-500 poise) or melt flow greater than 100 g/10 min. and generally greater than 200 g/10 min. and can be molded at injection pressures of less than 1,000 psi.

DESCRIPTION OF THE INVENTION

Because of their low viscosity, the compositions of this invention can be processed at molding pressures up to an order of magnitude lower than those conventionally employed, providing great economies in molds and molding machines as well as expanding the range of polyamide resins which may be molded practically. They can also be injection molded at conventional pressures when they contain unusually high concentrations of fibrous reinforcement, e.g., on the order of 50 volume %.

In the toughened, multiphase thermoplastic compositions of this invention the polyamide matrix will comprise 60 to 90 percent by weight of the composition, more than half and preferably more than 75% of the polyamide by weight will be aliphatic. The polyamide will have a number average molecular weight of 3,000 to 8,000 and preferably will either have an end group imbalance of at least about 1.9/1 or more and the sum of unbalanced and capped ends is greater than 100 g/$10^6$ gm of polymer, or have more than 200 equivalents of the sum of unbalanced ends and capped ends per $10^6$ gm of polyamide. The toughener will complementally be 10 to 40% by weight and grafted to 0.5 to 15% of the polyamide matrix including enhanced polyamide. The toughener polymer phase will have a tensile modulus of 10 to 10,000 psi and may be either a branched or straight chain polymer. The toughener is dispersed to a number average particle size preferably less than 1 micron and most preferably less than 0.5 micron, recognizing that a second component of toughener with larger particle size comprising up to the order of 5% of the composition would not make a major difference in the performance of the composite. The toughened compositions of this invention have a uniquely favorable balance of toughness (preferably a notched Izod at least 5 ft lbs/inch) and processability (melt flow at least 100 gms and generally at least 200 gms/10 minutes at 280° C. and 2160 grams weight in ASTM D-1238-73) and can be molded under low pressure, generally under 1,000 psi and preferably under 500 psi, and into large thin parts with long flow length.

The utility of these compositions derives from the unusually good combination of very high melt flow combined with unexpectedly good toughness for materials with such low molecular weight. The toughened high flow thermoplastic compositions can be molded under low pressure into a wide range of useful articles such as cabinets, instrument consoles, automotive exterior parts, tractor and truck consoles, sleds, stretchers, boats, pen barrels, louvres and the like, and a variety of parts with large surface area and thin sections.

The high molecular weight polyamides and the low molecular weight polyamides used to make the compositions of this invention are well known in the art and embrace those semicrystalline resins commonly referred to as nylons. Suitable polyamides include those described in U.S. Pat. Nos. 2,071,250; 2,071,251; 2,130,523; 2,130,948; 2,241,322; 2,312,966; 2,512,606; and 3,393,210.

The high molecular weight polyamides can be produced by condensation of equimolar amounts of a saturated dicarboxylic acid containing from 4 to 12 carbon atoms with a diamine, in which the diamine contains from 4 to 14 carbon atoms, or by condensation of lactams containing from 4 to 12 carbon atoms.

The low molecular weight polyamides are prepared by polymerization in conventional equipment and employing recipes containing a large excess of either diacid or diamine and/or substantial amount of monofunctional acid or amine to give the end groups specified above. Alternatively, the low molecular weight polyamide may be prepared by depolymerizing high molecular weight nylon generally above the melting point in the presence of oligomeric or monomeric mono and difunctional acids or amines as described above. Optionally, water and catalysts may be added.

Examples of polyamides, whether high or low molecular weight, include polyhexamethylene adipamide (66 nylon), polyhexamethylene azelaamide (69 nylon), polyhexamethylene sebacamide (610 nylon), and polyhexamethylene dodecanoamide (612 nylon), the polyamide produced by ring openings of lactams, i.e., polycaprolactam, polylauric lactam, poly-11-aminoundecanoic acid, bis(paraaminocyclohexyl) methane dodecanoamide. It is also possible to use in this invention mixtures of polyamides and polyamides prepared by the copolymerization of two of the above polymers or terpolymerization of the above polymers or their components, e.g., for example, a polyhexamethylene adipamide/polycaprolactam copolymer or an adipic/isophthalic acid/hexamethylene diamine copolymer with the limitation that aliphatic polyamide will comprise more than half and preferably more than 75% the matrix of the composition as initially prepared. Preferably, the polyamides are linear with a melting point in excess of 200° C.

To maintain stable, low number average molecular weight it is convenient for the polyamide matrix to have an imbalance of ends of at least about 1.9/1 or more and at least 100 equivalents of unbalanced ends per $10^6$ grams of polyamide, or that it contain a minimum of 200 equivalents of unbalanced ends and capped ends per $10^6$ grams of polyamide.

At the low molding pressures used with the polyamide blends of this invention, water levels conventionally acceptable (about 0.18%) in the molding blends will cause surface imperfections. Therefore, water levels below 0.1% are preferred. At these low water levels polyamide with balanced, uncapped ends will polymerize in the melt to approach the corresponding equilibrium molecular weight. In order to insure stabilization of the resins at low molecular weights, they must have an excess of either amine or carboxyl ends (unbalanced ends) or capped ends. It is preferred that the low molecular weight polyamide will have a combination of unbalanced ends and capped ends, if any, sufficient to result in the sum of the unbalanced ends and capped ends being at least 200 equivalents/$10^6$ grams of polyamide. For example, if Amine Ends = 150 eq/$10^6$ gm, and Acid Ends = 50 eq/$10^6$ gm, then Unbalanced ends = 100 eq/$10^6$ gm.

and if the number of Capped Ends = 110, then the sum is 210 ends.

The composition is toughened by the combination of at least one toughening polymer with the polyamide. The term "at least one toughener" means one or more polymers which coexist in single discrete particles having a requisite particle size. The toughening polymer or the mixture of polymers should have:
(a) sites which are grafted to the polyamide matrix so that 0.5-15 weight % and preferably 1-7 weight % of the polyamide matrix is either grafted or entrapped in the toughening polymer;
(b) tensile modulus, as added, in the range of about 10 to 10,000 psi, preferably about 10 to 5,000 psi, most preferably about 10 to 3,000 psi.

The polyamide is a continuous phase in the composition and the toughening polymer performs the function of a soft dispersed phase which is grafted to the polyamide matrix. The toughening polymer may be elastomeric, but it has been found that some thermoplastic polymers which are not elastomeric are also effective in the compositions.

The toughening polymers are branched or straight chain and are of such composition that crosslinking other than by grafting to the polyamide matrix is not necessary to their function and excessive crosslinking may, in fact, be harmful. Preferably the toughener particles will have a median size below 1000 nanometers, and most preferably a median size below 500 nanometers as measured by small angle x-ray scattering (SAXS).

Any toughening polymer phase which has the required tensile modulus, dispersed particle size and has graft sites to adhere to 0.5 to 15 wt. % and generally less than 7% of the polyamide matrix will confer the desired characteristic of toughness without excessively impairing high flow of the thermoplastic composition. Preferably, the graft sites will be present in the toughener as metal neutralized carboxyl, adjacent carboxyl, anhydride or epoxy functional groups, but other functional sites such as sulfonic acid or amine may be effective. These sites will be present in amounts that provide the requisite grafting. The concentration of graft sites will be
(i) 1.6-2.4 weight % of blend when the sites are metal neutralized carboxyl sites and the sites are 25-65% neutralized;
(ii) 0.02-0.1 weight % of blend when the sites are adjacent carboxyl or anhydride sites; and
(iii) 0.4-1.6 weight % of blend when the graft sites are epoxy sites.

Examples of some toughening agents include
(1) polymers of ethylene, at least one alpha-olefin of 3 to 6 carbon atoms, and at least one unsaturated monomer taken from the class consisting of branched, straight chain and cyclic hydrocarbon compounds having from 4 to 14 carbon atoms and having at least one additional nonconjugated unsaturated carbon-carbon bond, in which said polymer has grafted thereto an unsaturated monomer taken from the class consisting of
(a) alpha,beta-ethylenically unsaturated dicarboxylic acids having from 3 to 10 carbon atoms,
(b) monoesterified esters of such acids where the alcohol moiety contains 1 to 29 carbon atoms,
(c) anhydrides of dicarboxylic acids covered in (a), and
(d) metal salts of dicarboxylic acids and the monoesters of said dicarboxylic acid covered in (a) and (b) having from 0 to 100 percent of the carboxylic groups ionized by neutralization with metal ions.

Preferably, the polymer can be a copolymer of ethylene, propylene and 1,4-hexadiene and, optionally, norbornadiene, said copolymer having grafted thereto an unsaturated monomer taken from the class consisting of fumaric acid, maleic acid, maleic anhydride, the monoalkyl ester of said acids in which the alkyl group of the ester has 1 to 3 carbon atoms (one said polymer is grafted "Nordel" (Du Pont Co.));

(2) copolymers of ethylene, methyl or ethyl acrylate, and from about 0.0025-0.077 mole/100 g polymer of a mono alkyl ester of 1,4-butenedioic acid in which the alkyl group of the ester has 1 to 6 carbon atoms and having 0 to 100 percent of the esters of 1,4-butenedioic acid ionized by neutralization with metal ions selected from lithium, sodium, potassium, calcium and zinc ions (for example, one such polymer is "Vamac" (Du Pont Co.));

(3) ionic copolymers of units derived from alpha-olefin having the formula $RCH=CH_2$ wherein R is H or alkyl having from 1 to 8 carbon atoms and from 0.2 to 25 mole percent of units derived from an alpha,beta-ethylenically unsaturated mono- or dicarboxylic acid, at least 10% of the acid groups of said units being neutralized by metal ions having a valence of from 1 to 3, inclusive. Preferably, the copolymer will be made of ethylene and acrylic or methacrylic acid. For example, one such polymer is "Surlyn" (Du Pont Co.).

(4) Organic polymers which contain graft sites and sufficient alkyl acrylate, butadiene or substituted butadiene, isoprene, isobutylene, or similar rubber producing monomers to achieve the desired modulus.

Useful specific polymers for toughening polyamide compositions include: zinc salt of ethylene/isobutyl acrylate/methacrylic acid; ethylene/methyl acrylate/-monoethyl ester of maleic anhydride that is 0 to 100 percent neutralized with zinc, sodium, calcium, magnesium, lithium, antimony, or potassium salts; mixture of ethylene/isobutyl acrylate/methacrylic acid and ethylene/methyl acrylate/monoethyl ester of maleic anhydride and zinc salts thereof;ethylene/methyl acrylate/methacrylic acid and zinc salts thereof; zinc salts of ethylene/vinyl acetate/methacrylic acid; zinc salts of ethylene/methyl methacrylate/methacrylic acid; mixtures of ethylene/vinyl acetate and a zinc salt of ethylene/isobutyl acrylate/methacrylic acid; mixtures of ethylene/isobutyl acrylate and a zinc salt of ethylene/isobutyl acrylate/methacrylic acid; mixtures of ethylene/acrylic acid and ethylene/vinyl acetate; ethylene/vinyl acetate/maleic anhydride; ethylene/vinyl acetate monoethyl ester of maleic anhydride; ethylene/vinyl acetate/glycidyl methacrylate; ethylene/propylene/1,4 hexadiene-g-maleic anhydride; ethylene/propylene/1,4 hexadiene-g-nadic anhydride; mixtures of ethylene/propylene/1,4 hexadiene and ethylene/maleic anhydride; mixtures of ethylene/propylene/1,4 hexadiene and ethylene/propylene/1,4 hexadiene-g-maleic anhydride; ethylene/propylene/1,4 hexadiene/maleic anhydride neutralized with zinc rosinate; ethylene/propylene/1,4 hexadiene-g-fumaric acid; ethylene/propylene/1,4 hexadiene norbornadiene-g-maleic anhydride; ethylene/propylene/1,4 hexadiene/norbornadiene-g-monoethyl ester of maleic anhydride; ethylene/propylene/1,4 hexadiene/norbornadiene-g-fumaric acid; mixtures of ethylene/propylene/1,4 hexadiene and ethylene/monoethyl ester of maleic anhydride; mixtures of ethylene/propylene/1,4 hexadiene and ethylene/butyl hydrogen maleate; mixtures of ethylene/propylene/1,4 hexadiene and ethylene/maleic anhydride, mixtures of butadiene/acrylonitrile and styrene/maleic anhydride; mixtures of styrene/butadiene and ethylene/maleic anhydride; mixtures of ethylene/propylene/1,4 hexadiene/norbornadiene and styrene/maleic anhydride; isoprene/phthalic anhydride; mixtures of natural rubber and ethylene/monoethyl ester of maleic anhydride; butyl acrylate/monoethyl ester of fumaric acid; ethyl acrylate/fumaric acid; mixtures of ethylene/propylene and ethylene/monoethyl ester of maleic anhydride; ethylene/propylene/5-ethylidene-2-norbornene-g-fumaric acid, ethylene/propylene/dicyclopentadiene-g-monoethyl ester of maleic acid, ethylene/propylene/5-propylene-2-norbornene-g-maleic anhydride, ethylene/propylene/tetrahydroindene-g-fumaric acid, ethylene/propylene/1,4 hexadiene/5-ethylidene-2-norbornene-g-fumaric acid with concentrations and distribution of the monomers adjusted to achieve the desired modulus and grafting to the polyamide.

It is possible to mix two or more toughener polymers together, e.g., where at least one is the source of graft sites, and the other possibly being a diluent. Mixing may be accomplished by combining the polymers with the high molecular weight polyamide separately or in combination with the proviso that the polymer containing the graft sites must not be combined with the polyamide matrix resin prior to combination of any other polymers. In ethylene/propylene/diene polymers molecular weights equivalent to melt flow of 0.5 to 400 g/10 mins and more by ASTM D-1238 but at 280° C. and a total load of 2160 g are effective.

The melt flow of the compositions of this invention are greater than 100 grams per 10 minutes and preferably greater than 200 grams per 10 minutes measured by ASTM D-1238 at 280° C. and 2160 gram load, and the toughness as characterized by notched Izod is greater than 2 ft lbs/inch, preferably greater than 5, and most preferably, greater than 8. It is noted that flows greater than 1,000 grams/10 minutes are difficult to determine precisely with efflux times less than 5 seconds. Individual determinations do not vary more than 50% around an average when care is taken to maintain moisture level in the sample well below 0.05 weight %.

The balance of mechanical properties and processability of the compositions of the invention may be represented by the product of tensile strength (T.S.) in thousands of pounds/in$^2$, notched Izod in ft. lbs/in. and flow in gm/10 minutes. In the same units this product for "Zytel" 101, a commercial, unmodified nylon and for "Zytel" 801, a commercial toughened nylon, is in the range of 500 to 1,000. For the compositions of the present invention, the product of the three is at least 5,000, preferably 10,000 with a minimum notched Izod of 2 foot pounds per inch. This is several times as good as commercial compositions.

The compositions of the invention may be modified by one or more conventional additives such as stabilizers and inhibitors of oxidative, thermal, and ultraviolet light degradation; lubricants and mold release agents, colorants including dyes and pigments, fibrous and particulate fillers and reinforcements, nucleating agents, foaming agents, plasticizers, etc.

A preferred reinforcing filler is glass fiber. A particular virtue of the compositions of this invention is their ability to maintain adequate flow while containing unusually high levels of such reinforcing filler.

The toughened compositions of this invention can be prepared by melt blending, in a closed system, a polyamide and at least one toughener polymer in a uniform mixture in a multi-screw extruder such as a Werner Pfleiderer extruder having generally 2-5 kneading blocks and at least one reverse pitch to generate high shear, or other conventional dispersing devices such as a Brabender, Banbury mill, or the like.

EXAMPLES

General Procedure

The high molecular weight polyamides are prepared by conventional methods. The low molecular weight polyamides are prepared by conventional methods using the ingredients given in Table 2.

High molecular weight polyamide and toughener are dry blended and extruded to disperse the toughener. Then low molecular weight polyamide is added to reduce the molecular weight of the polyamide matrix. The high molecular weight polyamide/toughener mixture and low molecular weight polyamide in dry form are mixed after weighing in the proper proportions. The mixture is then blended in a 28 or 83 mm tri-lobal or 30 mm bi-lobal Werner Pfleiderer extruder in which the hopper is blanketed with nitrogen and the vacuum port maintained at about 25 to 30 inches vacuum. In some experiments with unextracted 6 nylon, residual monomer plugged the vacuum port causing reduced vacuum. In these cases, the residual caprolactam reduced the modulus of the final product. Extruder barrel temperatures on the smaller machines are set to rise from about 100° C. at the feed end to about 260° to 270° C. at the front end of the extruder and to 280° C. at the die, yielding melt temperatures of the blends in the range of 280° C. to about 360° C.

In some cases, the composition is formed in a single extrusion by preparing the first blend in the rear of the extruder and feeding the low molecular weight material as a sidestream.

The beading exiting the extruder is water quenched, cut and vacuum dried overnight (about 20-25 inches Hg with an N$_2$ bleed) at 80° C. prior to molding. Test bars, $\frac{1}{8} \times 5 \times \frac{1}{4}$ inch and tensile bars are molded in a 6 oz. injection molding machine. Hold-up times are usually about 5-6 minutes. Because of the radically better flow, the force of the spring on the bypass of the hydraulic system is reduced to permit operation at reduced pressures and a gage installed to read the low pressures. Rear barrel temperatures are set to 270°-280° C. rising to 280° C. at the front. Nozzle temperatures are set at 280°-290° C. The molds are heated by water having an inlet temperature of about 90° C. Molding is carried out with fast injection and a 20/20 or 20/30 molding cycle (seconds ram forward/second hold). The molded bars are tested using the following test procedures at room temperature in the dry-as-molded state.

EXAMPLES

Test Procedures

Notched Izod toughness: ASTM D-256-56 was followed, but with the average values of 3 bars taken at each end.

Tensile Strength: ASTM D-638-58T
Elongation. ASTM D-638-58T
Flexural Modulus: ASTM D-790-58T
Tensile Modulus of the polymers: ASTM D-882 (50% RH)

Melt Flow: ASTM D-1238-73 at 280° C. and 2160 gram load. Holdup in the melt indexer or is 3 minutes for molded bars and 8 minutes for molding resin.

Particle Size: Transmission electron microscope (TEM) on slices approximately 100 nanometers thick stained with phosphotungstic acid, and small angle x-ray scattering (SAXS).

Particle size is determined by small-angle x-ray scattering, according to the following technique: The small-angle x-ray scattering (SAXS) data should be acquired on a high-resolution instrument such as the one originally designed by Bonse and Hart Zeit. fur Physik, 189, 151 (1966), and subsequently manufactured commercially by Advanced Metals Research Corporation, Burlington. Mass., as the AMR Model 6-220 x-ray Low Angle Scattering Goniometer. A suitable sample of polyamide containing dispersed toughener particles consists of a molding (generally an injection-molded tensile or flex bar) of such thickness as to transmit about 1/e (1/2.71828 or 0.368) of a CuKα (wavelength=0.1542 nm) x-ray beam. This is the optimum thickness for transmission data (data acquired when the x-ray beam passes through the thickness of the sample along the surface normal), and is generally of the order of 80 mils (0.08 inches or about 2 mm) for a typical sample. A typical molding is usually too thick ($\frac{1}{8}$ inch or greater) but can be thinned by sawing or milling.

Scattered x-ray intensity data are acquired in the range from 8 to 600 seconds of arc (2-theta). The AMR instrument is calibrated in seconds; this corresponds to a range of 0.002° to 0.16° or $4 \times 10^{-5}$ to $3 \times 10^{-3}$ radians. Appropriate step sizes range upwards from 2 seconds of arc as the scattering angle increases; 20 points each at step-sizes of 2, 4, 8, and 16 seconds will cover the angular range in 81 points. These are "slit-smeared" results, and, after smoothing and subtraction of instrumental background, should be "desmeared" before interpretation. For this work, the data are desmeared by the method of Schmidt and Hight, Acta Cryst. 13,480 (1960); P. W. Schmidt, Acta Cryst., 19,938 (1965) to cover the range from 0.005° to 0.07° 2-theta. (The experimental angular range from 0.07° to 0.16° of the observed data is required only to desmear the retained results below 0.07°.) The desmeared intensity results can be represented as $I(h)$, where $$h = \frac{4\pi \sin\theta}{\lambda} = k \times 2\theta$$

Here, $\theta = (2\theta)/2$ and $\sin\theta = \theta$ in radians at these small angles, and $\lambda$ = the wavelength of CuKα radiation. These intensity results are converted to the "Invariant" argument, $h^2 I(h)$, by multiplying each desmeared intensity by the square of the angle of observation for that point.

A plot of the invariant argument will be characterized by having a maximum at an angle below 0.04° 2-theta if the dispersed particles causing the scattering have diameters of the order of hundreds of nanometers. If the particle-size distribution is narrow (nearly monodisperse), the particle diameter is inversely proportional to the position of this maximum: diameter=$4.87/2\theta_{max}$ nm. If there is finite breadth to the distribution, the peak position will be shifted to lower angles and the breadth of the distribution must be taken into account. For the results cited here, the observed invariant-argument curves were matched in calculated curves derived assuming a model of a log-normal particle-size distribution. For typical distributions, the most probable particle size is of the order of $\frac{2}{3}$ to $\frac{3}{4}$ that calculated on the basis of the peak position of the invariant argument alone.

In order to characterize a particle-size distribution in the manner employed here, two measurements are made on the invariant-argument curve. The angular position (2-theta), $h_m$, of the maximum is determined and the angular position of the "half-height" $h_h$, is determined. The half-height is that point on the invariant-argument curve which has an ordinate one-half that of the maximum and is on the high-angle side of the maximum. Given a log-normal model, the breadth of the distribution, expressed in relative terms, is a function only of the ratio, $R_h$, of these two angles: $R_h = h_h/h_m$. ($R_h$ should have a value greater than about 1.57. If it is significantly less than this, the position of the maximum of the curve has probably been displaced to higher angles by interparticle interference arising from close, regular packing of the particles.)

A log-normal distribution can be characterized by $R_s$, the ratio of the size at one-sigma of the distribution to the size at the center. For this work, an expression for $R_s$ was determined from $R_h$ by a third order polynomial regression fit to computer-generated data. This equation is:
$R_s = 1.19056 + 1.84535 R_h - 0.33524 R_h^2 + 0.030186 R_h^3$
(Note that when $R_h = 1.5728+$, $R_s = 1.00$ and the distribution is monodisperse. An $R_s$ of less than 1.0 has no physical meaning.)

For each distribution ratio, $R_s$, there is a factor, F, which can be used to correct the apparent size derived from the position of the invariant maximum corresponding to a monodisperse "distribution". Again, a third order polynomial fit was determined from a computer-generated model:
$F = 1.48725 - 0.4283 R_s - 0.062415 R_s^2 + 0.022482 R_s^3$.

The scattering curve from monodisperse spherical particles can be approximated at very low angles by $I(h) = k [\exp(-h^2 R_o^2/3)]$. (See A. Guinier & G. Fournet, *Small-Angle Scattering of X-Rays*, John Wiley & Sons, Inc., New York (1955) page 25), where $R_o$ is the radius of gyration. The invariant argument is then $kh^2 \cdot [\exp(-h^2 R_o^2/3)]$. From the differentiation of this expression, the condition for the maximum, $h_m^2 R_o^2/3 = 1$ or $R_o = \sqrt{3}/h_m$. Substituting for $$h_m = \frac{2 \cdot 2\theta_{max}}{\lambda}, \quad R_o = \frac{\lambda \sqrt{3}}{2\pi \cdot 2\theta_{max}}$$

where $\lambda$ CuKα 0.15418 nm, $R_o = 0.042502/2\theta_{max}$ if $2\theta$ is in radians, $R_o = 2.4352/2\theta_{max}$ if $2\theta$ is in degrees. For the approximation used in this work, the exponential (Gaussian) fit does not extend to angles as high as represented by the maximum of the invariant argument, and a better approximation is given by: $R_o = 2.182/2\theta_{max}$ where $2\theta$ is in degrees. Since the diameter of a sphere, D, as a function of the radius of gyration, $R_o$, is: $D = 2(\sqrt{5/3}) \cdot R_o$, then $D_m(nm) = 5.6339/2\theta^\circ_{max}$. $D_m$ is the diameter of a particle in a monodisperse "distribution", where all the particles are the same size. When there is a finite distribution of sizes modeled as described above, then the characteristic diameter, $D_c$, is derived from $D_m$ as: $D_c = F \cdot D_m$.

The SAXS method provides a convenient method for determining median values but is applicable only for median particle sizes below 1,000 nanometers. TEM is used for particle sizes above and below 1,000 nanometers. For several examples where the SAXS method is not applicable, particles are counted using a "quantimet" image analyses. Results are given below in Table A:

TABLE A

| Example | Number Average Longest Dimension Micrometers | Volume Average Longest Dimension Micrometers | Number of Particles Counted |
|---|---|---|---|
| 15 | .22 | 1.12 | 754 |
| 16 | .24 | .95 | 879 |
| 35 | .32 | 2.38 | 683 |
| 38 | .49 | 2.63 | 372 |
| 54 | .26 | 1.10 | 746 |

Although theories are still somewhat speculative, the number average may be considered to be more significant. Preferably, the number average will be less than 1,000 nanometers (less than 1 micron) and, more preferably, less than 500 nanometers (less than 0.5 micron).

Level of Graft and Entrapped Polyamide

Determined by soaking a film of the product approximately 2 mils thick in 90% formic acid/10% water once for 90 minutes and two times for 10 minutes each, then rinsing twice with distilled water and drying. Residual (grafted) nylon is determined by measuring nitrogen by the Kjehldahl method.

The method for graft level is difficult and gives approximate values. For example, mechanically trapped nylon is analyzed as grafted.

Inherent Viscosity: Measured as 0.5 gms/100 ml in 90% formic acid in water at 30° C.

Number Average Molecular Weight: Molecular weight of the polyamide raw materials is determined by end group anaylsis. Molecular weight of the matrix is calculated from molecular weight of the polyamide ingredients.

Determination of Acetamide Capped End Groups

The procedure for determining acetamide end groups in low molecular weight polyamides utilizes reaction with p-toluenesulfonic acid monohydrate in ethanol at 150° C. in a sealed tube for 16 hours. In this reaction, the acetamide group is hydrolyzed to acetic acid and simultaneously esterified to produce ethyl acetate. The amount of ethyl acetate produced is then measured via capillary gas chromatography.

Determination of Carboxyl and Amine Ends

Carboxyl ends are determined by dissolving polyamide in benzyl alcohol at 170±5° C. and titrating with dilute NaOH to a phenolphthalein end point. Amine ends are determined by dissolving polyamide in 85 phenol/15 methanol mixture and titrating with dilute perchloric acid to a potentiometric end point.

EXAMPLES

The Examples, Controls and Comparisons which follow are set forth in Table format. Percentages are by weight unless otherwise indicated.

A list and description of the high molecular weight polyamides used is set forth in Table 1.

A list and description of the low molecular weight polyamide diluents used is set forth in Table 2.

A list and description of tougheners used is set forth in Table 3.

The Examples of the invention are set forth in Table 4 in tabular format.

Control experiments carried out are set forth in Table 5.

Certain comparisons are set forth in Table 6.

Details of preparation of the Examples, Controls and Comparisons are set forth in Table 7.

An explanation of the Examples, Controls and Comparisons follows:

Example 1 illustrates use of a side feeder on the 30 mm extruder to introduce the low molecular weight polyamide. The concentrate of toughener in high molecular weight polyamide is fed to the rear of the extruder. This composition has a viscosity of approximately 300 poise at a temperature of 280° C. and a shear rate of 1,000 reciprocal seconds. Its flow rate is 56 gm/10 minutes. There is some ambiguity in concentration because of fluctuations in feed rates from two volumetric feeders used to feed the concentrate and the diluent. To some degree, this is true with other examples of side feeding. Example 2 differs from Example 1 in the toughener employed and in use of dry blending rather than side feeding to add the low molecular weight polyamide. Example 3 is a duplicate of Example 2.

In all blends made with more than 25% low molecular weight polyamide, mixing may be erratic, leading to erratic results. It is, therefore, preferred to use 25% of the low molecular weight component or less, with the component of sufficiently low molecular weight to give desired increase in flow or decrease in molecular weight of the final product. Despite this problem, a number of useful and interesting examples of this invention are made with diluent levels above 25%.

The concentrate for Example 4 is made with unextracted 6 nylon and a toughener with the concentration of graft sites selected to give sufficient grafting with the polyamide without causing excessive viscosity rise. 0.3 percent of CuI/KI/aluminum distearate in the ratios 7/1/0.5 is added as a heat stabilizer. An excellent combination of mechanical properties is obtained with moderately good flow.

The experiment is repeated as Examples 5 and 6. The variability in results appears to be due to a mixing problem on the 28 mm extruder with co-fed diluent in concentrate at a ratio of 40/60.

Examples 7 and 8 are similar to 5 and 6 in overall composition but greater toughness is obtained. Reducing molecular weight of the low molecular weight polyamide by a factor of 2 permits use of smaller amounts of low molecular weight polyamide. It is likely that the lower volume fraction required of the lower molecular weight material leads to greater reliability of mixing.

Example 9 is made using a concentrate made on the 28 mm extruder with the same composition as Example 10. Although results are similar to those obtained with Example 10 where the concentrate was prepared in a larger machine, the flex modulus is 200,000 psi compared to 140,000 for Example 10. It appears likely that in small equipment, the unextracted 6 monomer is removed more effectively than in the larger machine, thereby eliminating the plasticizing effect. Examples 10 and 11 made on the 28 mm extruder are identical in composition to Examples 7 and 8 made on the 30 mm with side feed. The extruder makes no difference in this situation where the weight fraction of low molecular weight polyamide is no more than 25%. Example 12 with a calculated number average molecular weight below 5,000 is still ductile and the flow is very high. This material molds to a glossy finish at 400 psi injection pressure. Example 13 gives a similar result with a slightly higher molecular weight low molecular weight polyamide. Example 14 is a duplicate of Example 12.

Examples 15 and 16 are identical except for the screw speed in preparation of the concentrate. The concentrate for 15 is prepared at 286 rpm. The concentrate for 16 is prepared at 240 rpm. The melt temperature of the concentrate for 15 is 353° C. measured with a thermocouple probe inserted into the melt at the die. The melt strand from the dilution step for these two samples is extremely rough indicating poor mixing. The mixing problem may arise from the comparatively high volume ratio of the low viscosity diluent and the high viscosity of the concentrate caused both by the comparatively high functionality of the toughened blend as well as the high concentration. Despite the mixing problem, toughness of these materials is very good. Example 17 represents an increase in the amount of 66 nylon in the final composition.

Examples 18 and 19 show the use of very low molecular weight low molecular weight polyamide with a large number of acetamide ends to achieve a good combination of toughness and flow. In Example 20 the matrix for the concentrate comprises 66 nylon and a 66/6 copolymer while in the next example, the matrix is comprised entirely of 66 nylon. In these two experiments, a "Kenics" static mixer is attached to the end of the extruder to aid mixing.

In Example 21 the polyamide matrix has a slightly higher molecular weight than in Example 20.

The product of Example 22, made by side feeding a low molecular weight polyamide containing acetamide ends is less tough than Example 1, but flow is better.

Examples 23, 24, 25 and 26 also contain only 66 nylon in the matrix. Mechanical properties are good. Compositions with mixtures of 66 and 6 nylon or 66/6 copolymer present tend to have superior combinations of flow and toughness. Example 25B is molded with about 15 minutes hold-up time in the barrel of the molding machine, rather than the customary 5 or 6 minutes. At this hold-up time at temperatures of 280° C., agglomeration of the toughener may begin to occur, adversely affecting mechanical properties. The time for this problem to occur may vary with composition.

Example 27 demonstrates the effect of hold-up time in the molding machine for approximately 5, 10 and 15 minutes (A, B, and C, respectively) with a composition which contains a mixture of 66 and unextracted 6 nylon. Example 28A, B, C also demonstrates the effect of the same variation of hold-up time. The two sets may show the effect of varying the molecular weight and flow.

Example 29 contains a concentrate prepared with comparatively high molecular weight polyamides and is diluted with a substantial amount of low molecular weight polyamide to give a good combination of mechanical properties and flow.

Example 30 demonstrates an excellent combination of mechanical properties and flow, as well as the range of variability.

Example 31 demonstrates that polyamide containing water and a polymerization catalyst, phenylphosphinic acid, with unextracted 6 nylon in the concentrate can be used.

Examples 32 through 49 are made using unextracted 6 nylon and various combinations of tougheners to prepare the concentrates. Low molecular weight polyamides include 66 and 6 nylon. Examples 46 and 48 have high acid ends. Examples where low concentrations (about 2%) of tougheners with high functionality (close to 2 weight % anhydride) are added sometimes give erratic results. The maximum toughener particle size in several examples is several microns, approaching 5 microns. Although those skilled in the art will recognize that smaller particle size, in the micron range, is generally preferred, it does not appear to be a critical parameter with the low molecular weight matrix, as long as modulus of the toughener and graft sites are controlled. Reference to Table A shows that number average particle size is likely to be below 1,000 nanometers and preferably below 500 nanometers even when some much larger particles are present. Results are erratic with low molecular weight polyamide additive levels over 25%, at least in part because of problems in mixing above this level, but a ductile product has been made at an additive level of 28% with number average molecular weight of the matrix as low as 3,100. See Example 43. An approach not used in these experiments to reduce the mixing problem is to run staged dilutions. Note that the matrix for Example 43, Control 7, Table 6, taken through the same processing steps as the toughened material, has a notched Izod of 0.25 ft lbs/inch, a tensile strength of 4.9 Kpsi and an elongation of 1.3%.

Examples 49 through 53 demonstrate that excellent combinations of mechanical properties and flow can be obtained using concentrates which contain only polyamide copolymers as the matrix.

Example 54 shows the effect of adding amorphous polyamide where amorphous polyamide content is about 20% of the total nylon present. Higher levels of amorphous content affect toughness adversely.

Example 55 demonstrates that an acrylic toughener may be employed to produce a product of this invention, though in a companion experiment with rubber content at 28%, flow is only ⅓ as great.

Example 56 demonstrates that satisfactory product can be obtained in a single extrusion process where concentrate is prepared in the back end of an extruder and diluent is added as a side stream. A static mixer is employed in this experiment to provide more mixing. It is expected that appropriate extruder screw design would be sufficient to achieve good product without use of a static mixer.

Examples 57 and 58 show that a single screw extruder run at two different screw speeds can be used to dilute a toughened concentrate to good product.

Example 59 shows that use of a single screw extruder can be extended to use a screw injection molding machine to dilute the concentrate and mold the product, but variability of the product with limited mixing may be a problem, as suggested by two flow values of 1070 and 209 grams/10 minutes.

The compositions of this invention are particularly suitable for reinforcement. Glass reinforcement is illustrated by a composition which contained 40% of the product of Example 45 and 60% OCF P353B glass. The composition could be molded into ⅛ inch test bars at 5,800 psi injection pressure. The bars had a notched Izod at the gate end of 6.8 ft. lbs/inch and 8.1 ft. lbs/inch at the far end. The modulus was 1,840,000 psi.

The compositions of this invention can be blended with commercial compositions to get improved combinations of mechanical properties and flow. A commercial polyamide/glass reinforced composition, "Zytel" 80G43L, was diluted from 43 to 33% glass by adding product of Example 45. Izod toughness was the same as that of the commercial polyamide product, "Zytel" 80G33L, and melt flow was 5.6 grams/10 minutes versus no flow for "Zytel" 80G33L in this test. Similar advantages could be expected in mineral filled and unreinforced compositions.

Controls

Controls 1 and 2 are to be compared with Example 4 in Table 4 to examine the effect of molecular weight at constant toughener concentration. Although mixing of high molecular weight diluent into concentrate in these cases would be expected to be comparatively easy, no benefit is seen in particle size or notched Izod. In this series of experiments, it appears that over more than a 3-fold range of polyamide matrix molecular weight, toughness is substantially unaffected—a remarkable conclusion.

Control 3 is another example of prior art technology with the typical flow, about two orders of magnitude less than the typical values of this invention. Control 4 is the 66 nylon matrix for Control 3.

Control 5 is untoughened polyamide matrix compared with toughened material in Table 6.

ST811HS is an example of the prior art with a matrix of unextracted 6 nylon. Again, flow is very low.

Comparison of Toughened and Untoughened Materials

Particularly dramatic examples of the advantages of this invention are presented in Table 6. The two untoughened materials, Controls 7 and 8 are processed in the same way as the toughened samples Examples 43 and 45. The untoughened materials have such low elongation and notched Izod toughness that they would have no commercial value as mechanical parts. Toughened by the techniques of the invention, however, toughness is dramatically improved and the melt flow is very high.

TABLE 1

| HIGH MOLECULAR WEIGHT POLYAMIDES | | | | | |
|---|---|---|---|---|---|
| NUMBER | COMPOSITION | COOH END GRPS | NH2 END GRPS | IV (2) | CALC Mn |
| H1 | 66 nylon | 75 | 46 | 1.01 | 16,500 |
| H2 | 66 nylon | 98 | 75 | 0.77 0.76 | 11,500 |
| H3 | 77.5/22.5 66/6 nylon copolymer | 33 | 33 | 1.56 | 30,000 |
| H4 | 66 nylon | 41 | 24 | 1.65 1.55 | 31,000 |
| H5 | 6 nylon (unextracted) | 35 | 41 | 1.24 | 26,300 |
| H6 | 73/27 66/6 nylon copolymer (1) | 58 | 51 | 1.05 | 17,900 |
| H7 | 73/27 66/6 nylon copolymer | 58 | 51 | 1.06 | 17,900 |
| H8 | 6 nylon (extracted) | 43 | 54 | 1.19 | 20,600 |
| H9 | amorphous | 123 | 41 | 0.32 | 12,200 | end group units = eq/1,000,000 gms
(1) 0.025% copper stearate
(2) inherent viscosity

TABLE 2

| LOW MOLECULAR WEIGHT POLYAMIDES MADE BY AUTOCLAVE POLYMERIZATION | | | | | | | |
|---|---|---|---|---|---|---|---|
| NUMBER | 66 NYLON SALT LBS | HMD (3) | ACETIC ACID LBS | COOH END GRPS | NH2 END GRPS | ACETAMIDE END GRPS | CALC Mn |
| L1 | 37.8 | 1.04 | 0.65 | 30 | 189 | 310 (calc) | 3780 |
| L2 | 37.8 | 1.04 | 0.65 | 22 | 201 | 310 (calc) | 3750 |
| L3 | 37.8 | 1.04 | 0.65 | 28 | 189 | 276 | 4060 |
| L4 | 37.8 | 2.08 | 1.3 | 40 | 354 | 620 (calc) | 1950 |
| L5 | 100 | 11.9 | 7.4 | 11 | 420 | 864 | 1540 |
| L6 | 100 | 3.57 | 2.2 | 25 | 214 | 338 | 3470 |
| L7 | 100 | 5.94 | 3.7 | 10 | 520 | 526 | 1890 |
| L8 | 100 | 11.9 | 7.4 | 6 | 504 | 874 | 1440 |
| L9 | 100 | 11.9 | 7.4 | 9 | 546 | 947 | 1330 |
| L10 | 100 (1) | 11.9 | 7.4 | 10 | 522 | 949 | 1350 |
| L11 | 100 | 11.9 | 7.4 | 12 | 606 | 951 | 1275 |
| L12 | 100 | 5.9 | 10.5 | 316 | 12 | 1219 | 1290 |
| L13 | 100 | | 9 (2) | 788 | 13 | | 2500 |
| L14 | 100 | 11.9 | 7.4 | 15 | 375 | 999 | 1440 |
| L15 | 100 | 11.9 | 7.4 | 20 | 431 | 999 | 1380 |
| L16 | 37.8 | 1.38 | 0.87 | 50 | 254 | 368 | 2980 | matrices L1 thru L10, L16 contain 0.008% antifoam "Dow Corning B"
matrices L5 thru L15 contain 0.004% antifoam "Carbowax 8000"
(1) caprolactam in lieu of 66 nylon salt
(2) adipic acid in lieu of acetic acid
(3) hexamethylenediamine

TABLE 3

| NUMBER | COMPOSITION | TOUGHENERS MELT FLOW (2) gm/10 min | TENSILE MODULUS ASTM D882 Kpsi |
|---|---|---|---|
| T1 | E/P/Hexadiene/Norbornadiene-g-MAnh ca68/ca27/4.1/0.4/-1.69 (acid & anhydride) | 1 | 1.146 |
| T2 | E/nBa/MAA 70.7/21/8.3 (54-55% Zinc neutralization) | 9 | 3.837 |
| T3 | E/P/Hexadiene/Norbornadiene-g-MAnh ca68/ca27/4.1/0.4/-0.34 (acid & anhydride) | 2.4 | 1.659 |
| T4 | E/P/Hexadiene/Norbornadiene ca68/26/ca6.3/0.15 | 0.3 | 1.027 |
| T5 | Cyanacryl C (1) (AMERICAN CYANAMID) | 0.6 | 0.07 |
| T6 | T8,50%/T9,50% | 1.5 | 1.152 |
| T7 | T1,50%/T9,50% | 0.6 | 0.784 |
| T8 | E/P/Hexadiene/Norbornadiene-g-MAnh ca68/ca27/4.1/0.4/-2.45 (acid & anhydride) | 5 | 1.587 |
| T9 | E/P/Hexadiene 53/ca42/ca4.7 | 2.9 | 0.13 |

(1) used 2% (by weight) SMA3000 (ARCO)-styrene/maleic anhydride copolymer (25% Ma)
(2) ASTM D 1238 Condition G
Cyancryl C-polyacrylic rubber
E-ethylene
P-propylene
nBa-normal butyl acrylate
MAA-methacrylic acid

TABLE 4
EXAMPLES

| NUMBER | TOUGHENER NUMBER(S) | MATRIX NUMBER(S) | % LMWN (1) | MATRIX Mn | MATRIX IMBALANCE + CAPPED ENDS | END GROUP RATIO | GRAFT LEVEL % | SAXS nano meters |
|---|---|---|---|---|---|---|---|---|
| 1 | T6,20% | H3,30% L1,50% | 50 | 5600 | 294 | 4.2 | 5.71 | 241 |
| 2 | T2,20% | H3,30% L1,50% | 50 | 5600 | 294 | 4.2 | 5.18 | 306 |
| 3 | T2,20% | H3,30% L1,50% | 50 | 5600 | 294 | 4.2 | 3.01 | 382 |
| 4 | T3,16.8% | H5,43.2% L2,40.0% | 40 | 6800 | 238 | 4.1 | 1.58 | 403 |
| 5 | T3,16.8% | H5,43.2% L3,40.0 | 40 | 7200 | 213 | 3.5 | 7.01 | 335 |
| 6 | T3,16.8% | H5,43.2% L3,40.0% | 40 | 7200 | 213 | 3.5 | 5.5 | 349 |
| 7 | T3,21% | H5,54% L4,25% | 25 | 5300 | 299 | 3.8 | 3.42 | 282 |
| 8 | T3,22% | H5,58% L4,20% | 20 | 6300 | 244 | 3.3 | 5.86 | 284 |
| 9 | T3,21.0% | H5,54.0% L4,25.0% | 25 | 5300 | 300 | 3.8 | 4.82 | 262 |
| 10 | T3,21.0% | H5,54.0% L4,25.0% | 25 | 5300 | 300 | 3.8 | 2.75 | 333 |
| 11 | T3,22.4% | H5,57.4% L4,20.0% | 20 | 6200 | 246 | 3.4 | 3.11 | 329 |
| 12 | T3,19.6% | H5,50.4% L4,30.0% | 30 | 4600 | 352 | 4.3 | 2.40 2.33 | 349 |
| 13 | T3,18.2% | H5,46.8% L16,35.0% | 35 | 6000 | 249 | 3.2 | 3.71 5.76 | 347 |
| 14 | T3,19.6% | H5,50.4% L4,30% | 30 | 4600 | 352 | 4.3 | 1.78 | 341 |
| 15 | T7,26% | H3,39.0% L16,35% | 35 | 6000 | 271 | 3.3 | 5.56 | 865/258 (2) |
| 16 | T7,26% | H3,39.0% L16,35.0% | 35 | 6000 | 271 | 3.3 | 3.02 | 930/252 (2) |
| 17 | T3,22.0% | H3,24.0%/H1,12.0% H4,12.0%/L4,30.0% | 30 | 4500 | 353 | 3.6 | 3.71 | 282 |
| 18 | T3,23.8% | H5,61.2% L5,15.0% | 15 | 6300 | 259 | 3.8 | 4.24 | 326 |
| 19 | T3,23.0% | H5,59.0% | 18 | 5500 | 303 | 4.4 | 2.8 | 329 |

TABLE 4-continued

EXAMPLES

| | | | | | | | | |
|---|---|---|---|---|---|---|---|---|
| 20 | T3,26.0% | L5,18.0% H6,31.0%/H1,31.0% | 12 | 6500 | 191 | 1.9 | 4.02 | 509 |
| 21 | T3,26.0% | L5,12.0% H4,31.0%/H1,31.0% | 12 | 7100 | 139 | 1.9 | 5.82 | 359 |
| 22 | T3,18% | L5,12.0% H5,47% | 35 | 6900 | 228 | 3.7 | 3.76 | 367 |
| 23 | T3,26.0% | L6,35% H1,31%/H4,31% | 12 | 7100 | 139 | 1.9 | 5.22 | 336 |
| 24 | T3,25.0% | L5,12% H4,29.0%/H1,29.0% | 18 | 5300 | 284 | 2.7 | 6.12 | 402 |
| 25A | T3,26.0% | L5,18.0% H4,31.0%/H1,31.0% | 12 | 7100 | 187 | 1.9 | 9.57 | 349 |
| 25B | T3,26.0% | L5,12.0% H4,31.0%/H1,31.0% | 12 | 7100 | 187 | 1.9 | 4.41 | 382 |
| 26 | T3,25.5% | L5,12.0% H1,59.5% | 15 | 5600 | 233 | 2 | 3.74 | 471 |
| 27A | T3,24.6% | L5,15.0% H5,63.4% | 12 | 7400 | 207 | 3.2 | 5.09 | 309 |
| 27B | T3,24.6% | L5,12.0% H5,63.4% | 12 | 7400 | 207 | 3.2 | 3.73 | 310 |
| 27C | T3,24.6% | L5,12.0% H5,63.4% | 12 | 7400 | 207 | 3.2 | 8.3 | 315 |
| 28A | T4,19.0% T1,4.7% | L5,12.0% H8,55.3% L9,21.0% | 21 | 4100 | 415 | 5.6 | 2.64 2.64 | 339 |
| 28B | T4,19.0% T1,4.7% | H8,55.3% L9,21.0% | 21 | 4100 | 415 | 5.6 | 2.32 2.44 | 371 |
| 28C | T4,19.0% T1,4.7% | H8,55.3% L9,21.0% | 21 | 4100 | 415 | 5.6 | 2.78 2.85 | 419 |
| 29 | T3,22.5% | H4,26.3%/H3,26.3% L7,25.0% | 25 | 5200 | 328 | 6.6 | 3.73 | 732/226 (2) |
| 30 | T3,22.5% | H5,52.5% L7,25.0% | 25 | 5100 | 339 | 7.2 | 2.47 | 268 |
| 31 | T3,25.5% | H3,29.8%/H1,29.8% L8,15.0% | 15 | 5700 | 265 | 3 | 3.6 | 313 |
| 32 | T3,22.5% | H8,52.5% L7,25.0% | 25 | 4900 | 339 | 6.3 | 3.7 | 238 |
| 33 | T4,20.4% T1,5.1% | H8,59.5% L9,15.0% | 15 | 5300 | 307 | 4.2 | 3.37 | 374 |
| 34 | T4,19.0% T1,4.7% | H8,55.3% L9,21% | 21 | 4100 | 415 | 5.6 | 3.64 | 359 |
| 35 | T4,23.8% T1,1.7% | H8,59.5% L9,15.0% | 15 | 5300 | 307 | 4.2 | 1.74 | >1000 |
| 36 | T3,25.5% | H8,59.5% L10,15.0% | 15 | 5300 | 307 | 4.1 | 3.44 | 257 |
| 37 | T4,23.0% T1,2.6% | H8,59.5% L10,15.0% | 15 | 5300 | 307 | 4.1 | 2.53 2.12 | 539 |
| 38 | T4,23.8% T1,1.7% | H8,59.5% L10,15.0% | 15 | 5300 | 307 | 4.1 | 1.77 | >1000 |
| 39 | T4,20.4% T1,5.1% | H8,59.5% L10,15.0% | 15 | 5300 | 307 | 4.1 | 3.81 3.81 | 348 |
| 40 | T7,18.2% | H8,53.2% L9,24.0% | 24 | 3800 | 469 | 6.4 | 4.07 3.23 | 346 |
| 41 | T4,17.5% T1,4.4% | H8,51.1% L9,27.0% | 27 | 3400 | 521 | 7.2 | 4.07 | 348 |
| 42 | T4,13.0%/T3,10.1% T1,2.2% | H8,46.8% L11,28% | 28 | 3100 | 585 | 8.3 | 4.04 | 311 |
| 43 | T4,13.0%/T3,10.1% T1,2.2% | H8,46.8% L11,28.0% | 28 | 3100 | 553 | 8.3 | 3.14 | 304 |
| 44 | T4,13.7%/T3,10.6% T1,2.2% | H8,49.4% L12,24.0% | 24 | 3500 | 491 | 3.3 | 2.26 | 299 |
| 45 | T4,13.7%/T3,10.6% T1,2.3% | H8,49.4% L11,24.0% | 24 | 3500 | 512 | 7.1 | 4 | 318 |
| 46 | T4,14.2%/T3,11.1% T1,2.4% | H8,51.4% L13,21.0% | 21 | 6800 | 216 | 6.2 | 2.12 2.19 | 367 |
| 47 | T4,13.7%/T3,10.6% T1,2.3% | H8,49.4% L11,24.0% | 24 | 3500 | 512 | 7.1 | 3.89 | 309 |
| 48 | T4,14.2%/T3,11.1% T1,2.4% | H8,51.4% L13,21.0% | 21 | 6800 | 216 | 6.2 | 3.4 | 367 |
| 49 | T4,13.7%/T3,10.6% T1,2.2% | H7,33.1%/H3,16.3% L10,24.0% | 24 | 3700 | 474 | 5.5 | 3.24 | 507 |
| 50 | T3,26.6% | H7,33.1%/H3,16.3% L11,24.0% | 24 | 3500 | 502 | 6.1 | 3.96 | 575 |
| 51 | T4,13.7%/T3,10.6% T1,2.3% | H7,37.0%/H3,12.4% L11,24.0% | 24 | 3500 | 501 | 5.6 | 3.05 | 634 |
| 52 | T4,13.7%/T3,10.6% T1,2.3% | H7,39.5%/H3,9.9% L11,24.0% | 24 | 3500 | 501 | 5.8 | 2.88 | 633 |
| 53 | T4,13.7%/T3,10.6% T1,2.3% | H7,33.1%/H3,16.3% L11,24.0% | 24 | 3500 | 502 | 6.1 | 2.94 | 619 |
| 54 | T4,13.7%/T3,10.6% T1,2.3% | H3,34.2%/H9,15.2% L14,24.0% | 24 | 3900 | 427 | 3.2 | 3.36 | >1000 |

TABLE 4-continued

| | | EXAMPLES | | | | | | |
|---|---|---|---|---|---|---|---|---|
| 55 | T7.25.4% | H1.29.65/H3.29.65% L12.15.3% | 15.3 | 5200 | 324 | 3.2 | 3.16 | 419 (3) |
| 56 | T3.25% | H1.30%/H3.30% L15.15% | 15 | 5600 | 271 | 2.5 | 2.74 2.93 | 653 |
| 57 | T3.23.5% | H5.60.5% L15.16.0% | 16 | 5500 | 299 | 3.8 | 2.78 | 377 |
| 58 | T3.23.5% | H5.60.5% L15.16.0% | 16 | 5500 | 299 | 3.8 | 3.36 | 311 |
| 59 | T3.23.8% | H5.61.2% L8.15.0% | 15 | 6000 | 275 | 4.5 | 5.74 | 352 |

| NUMBER | MAXIMUM TEM PARTICLE SIZE nanometers | FLOW gm/ 10 min | % water (4) | GATE IZOD ft lbs/in | FAR IZOD -ft lbs/in | TENSILE STRENGTH Kpsi | ELON- GATION % | FLEXURAL MODULUS Kpsi | PRODUCT (5) |
|---|---|---|---|---|---|---|---|---|---|
| 1 | 700 | 56 | 0.024 | 14.8 | 14.6 | 6.5 | 57 | 257 | 5400 |
| 2 | 3600 | 660 | 0.017 | 3.2 | 3.4 | 7.4 | 24 | 270 | 15700 |
| 3 | 1700 | 460 | 0.005 | 3.2 | 3.3 | 7.4 | 25 | 260 | 10900 |
| 4 | 600 | 480 | 0.018 | 14.6 | 14.9 | 6.8 | 80 | 274 | 47300 |
| 5 | 1400 | 610 | 0.02 | 8.2 | 7.2 | 7.6 | 51 | 180 | 38000 |
| 6 | 1000 | 600 | 0.04 | 4.9 | 6.6 | 6.7 | 51 | 204 | 19600 |
| 7 | 1300 | 400 | 0.002 | 12.1 | 12.2 | 5.4 | 76 | 132 | 26400 |
| 8 | 800 | 190 | 0.007 | 13.5 | 14.2 | 5.3 | 120 | 124 | 13800 |
| 9 | 800 | 470 | 0.004 | 13.4 | 13.2 | 6.1 | 49 | 204 | 38000 |
| 10 | 1700 | 630 | 0.017 | 11.8 | 12.5 | 5.4 | 102 | 141 | 40100 |
| 11 | 1100 | 270 | 0.008 | 13.1 | 13.8 | 5.2 | 123 | 132 | 18500 |
| 12 | 1500 | 580 | 0.021 | 10.8 | 11 | 5.6 | 99 | 146 | 35200 |
| 13 | 1200 | 510 | 0.013 | 9.7 | 10.1 | 6 | 100 | 162 | 29900 |
| 14 | 1300 | 590 | 0.012 | 8.9 | 8.7 | 6.1 | 72 | 181 | 32000 |
| 15 | 2000 | 180 | 0.025 | 16.2 | 16.1 | 5.4 | 62 | 200 | 15400 |
| 16 | 1500 | 140 | 0.016 | 16.2 | 16.3 | 5.4 | 71 | 193 | 12300 |
| 17 | 1500 | 550 | 0.015 | 10.7 | 10.4 | 6.7 | 22 | 247 | 39600 |
| 18 | 1500 | 220 | 0.019 | 11 | 11.6 | 5.4 | 85 | 169 | 12900 |
| 19 | 1300 | 350 | 0.028 | 10.3 | 10.3 | 5.5 | 89 | 182 | 20000 |
| 20 | 1300 | 170 | 0.032 | 12 | 11.9 | 5.6 | 37 | 214 | 11700 |
| 21 | 2400 | 110 | 0.014 | 12.2 | 12.6 | 6 | 39 | 242 | 8100 |
| 22 | 600 | 250 | 0.008 | 9.7 | 9.6 | 6.7 | 60 | 160 | 15900 |
| 23 | 2400 | 83 | 0.02 | 14 | 14 | 6.4 | 37 | 244 | 7400 |
| 24 | 1400 | 320 | 0.018 | 8 | 10.3 | 6.4 | 20 | 261 | 16200 |
| 25A | 2500 | 89 | 0.012 | 14 | 14.2 | 6.3 | 31 | 252 | 7800 |
| 25B | 1300 | 140 | 0.002 | 10.3 | 10.4 | 5.8 | 24 | 230 | 8600 |
| 26 | 3600 | 290 | 0.017 | 9.7 | 9.9 | 6.2 | 12.6 | 248 | 17400 |
| 27A | 1700 | 110 | 0.003 | 12.1 | 12.9 | 5.6 | 131 | 121 | 7300 |
| 27B | 1400 | 130 | 0.003 | 11.2 | 11.8 | 5.4 | 115 | 118 | 7700 |
| 27C | 1400 | 210 | 0.014 | 10.1 | 10.2 | 5.5 | 99 | 121 | 11600 |
| 28A | 800 | 320 | 0.004 | 17.8 | 18 | 5.6 | 46 | 200 | 32100 |
| 28B | 1200 | 330 | 0.001 | 15.4 | 15.3 | 4.9 | 36 | 183 | 24500 |
| 28C | 1900 | 310 | 0.001 | 3.5 | 3.8 | 4.8 | 27 | 180 | 5200 |
| 29 | 1800 | 320 | 0.009 | 11.1 | 11.3 | 6.4 | 26 | 247 | 22400 |
| 30 | 1000 | 390 | 0.01 | 12.3 | 12.2 | 5.5 | 78 | 193 | 26200 |
| 31 | 2500 | 130 | 0.029 | 11.4 | 11.4 | 5.5 | 21 | 207 | 8300 |
| 32 | 900 | 500 | 0.016 | 12.1 | 12 | 6.5 | 36 | 239 | 39600 |
| 33 | 1000 | 230 | 0.018 | 19.2 | 19.4 | 5.9 | 47 | 221 | 26400 |
| 34 | 900 | 520 | 0.019 | 17.8 | 18.3 | 5.9 | 50 | 222 | 54600 |
| 35 | 4700 | 260 | 0.013 | 11.4 | 11.8 | 5.2 | 58 | 203 | 15500 |
| 36 | 1400 | 370 | 0.016 | 10.2 | 10.2 | 5.9 | 29 | 201 | 22000 |
| 37 | 3200 | 480 | 0.01 | 14.9 | 15 | 5.3 | 63 | 196 | 37500 |
| 38 | 3900 | 420 | 0.019 | 4 | 11 | 5 | 49 | 205 | 8400 |
| 39 | 1000 | 280 | 0.022 | 18.1 | 18.8 | 5.8 | 39 | 206 | 29200 |
| 40 | 1200 | 770 | 0.008 | 16.3 | 15.8 | 5.6 | 46 | 205 | 70300 |
| 41 | 1000 | 1050 | 0.021 | 16.2 | 15.6 | 5.7 | 38 | 211 | 96500 |
| 42 | 1400 | 830 | 0.001 | 11.9 | 11.6 | 5.3 | 28 | 192 | 52300 |
| 43 | 1200 | 820 | 0.025 | 13.3 | 12.4 | 5.4 | 30 | 190 | 58900 |
| 44 | 1300 | 1410 | 0.027 | 3.4 | 3.3 | 5.3 | 25 | 183 | 25500 |
| 45 | 1000 | 800 | 0.009 | 13.2 | 13.4 | 5.3 | 37 | 196 | 55900 |
| 46 | 2300 | 1080 | 0.01 | 4.4 | 7.2 | 4.9 | 26 | 185 | 23300 |
| 47 | 1400 | 830 | 0.006 | 12.9 | 12.4 | 5.3 | 29 | 197 | 56600 |
| 48 | 3300 | 1060 | 0.016 | 2.1 | 5.1 | 4.8 | 27 | 174 | 10700 |
| 49 | 2200 | 430 | 0.012 | 4.5 | 4.4 | 4 | 44 | 118 | 7700 |
| 50 | 2400 | 480 | 0.014 | 11 | 11 | 4.9 | 25 | 180 | 26000 |
| 51 | 1900 | 520 | 0.014 | 10.2 | 11.3 | 4.8 | 26 | 190 | 25300 |
| 52 | 2400 | 480 | 0.009 | 2.6 | 4.6 | 4.8 | 20 | 187 | 6000 |
| 53 | 2300 | 830 | 0.005 | 11.2 | 11.6 | 4.8 | 25 | 187 | 44700 |
| 54 | 2500 | 310 | 0.006 | 10.8 | 11.1 | 5.6 | 41 | 204 | 18600 |
| 55 | 930 | 550 | 0.003 | 3.5 | 3.6 | 6.3 | 45 | | 12000 |
| 56 | 4200 | 310 | 0.008 | 9.2 | 9.5 | 6.4 | 31 | 223 | 18000 |
| 57 | 1400 | 430 | 0.015 | 11.4 | 11.7 | 5.2 | 66 | 130 | 25300 |
| 58 | 2200 | 200 | 0.009 | 11.7 | 13.2 | 4.4 | 93 | 90 | 10000 |

TABLE 4-continued

EXAMPLES

| | | | | | | | | |
|---|---|---|---|---|---|---|---|---|
| 59 | 2400 | 210 | 0.004 | 14 | 14.6 | 4.6 | 120 | 13500 |

(1) LMWN-low molecular weight nylon
(2) bimodal distribution
(3) significant number of particles >1000 nm
(4) % moisture for flow measurement
(5) PRODUCT-(GATE IZOD) (TENSILE STRENGTH) (FLOW)

TABLE 5

CONTROLS

| NUMBER | TOUGHENER NUMBER(S) | MATRIX NUMBER(S) | % LMWN (2) | MATRIX Mn | MATRIX IMBALANCE + CAPPED ENDS | END GROUP RATIO | GRAFT LEVEL % | SAXS nano meters |
|---|---|---|---|---|---|---|---|---|
| C1 | T3,16.8% | H5,43.2% H1,40.0% | 40 | 20500 | 11 | 1.2 | 12.36 | 247 |
| C2 | T3,16.8% | H5,43.2% H2,40.0% | 40 | 16200 | 8 | 1.1 | 4.96 | 294 |
| C3 | T4,10.0% T1,9.0% | H1,81.0% | 0 | 16500 | 29 | 1.6 | 5.61 | 385 |
| C4 | (1) | H1,100.0% | 0 | 16500 | 29 | 1.6 | (1) | (1) |
| C5 | (1) | H8,71% L11,29% | 29 | 3800 | 456 | 6.3 | (1) | (1) |
| C6 | T3,28% | H5,72% | | 26300 | 5 | 1.2 | 11.74 | |

| NUMBER | MAXIMUM TEM PARTICLE SIZE nanometers | FLOW gm/ 10 min | % water (3) | GATE IZOD ft lbs/in | FAR IZOD ft lbs/in | TENSILE STRENGTH Kpsi | ELON- GATION % | FLEXURAL MODULUS Kpsi | PRODUCT (4) |
|---|---|---|---|---|---|---|---|---|---|
| C1 | 2400 | 27 | 0.006 | 13.8 | 15.4 | 7.6 | 95 | 237 | 2830 |
| C2 | 1400 | 49 | 0.03 | 13.1 | 14.7 | 7.4 | 80 | 236 | 4750 |
| C3 | 1500 | 8 | 0.022 | 18.3 | 20.7 | 7.3 | 50 | 231 | 1070 |
| C4 | (1) | 94 | 0.024 | 1.2 | 0.7 | 12.4 | 38 | 405 | 920 |
| | | 55 | 0.015 | (5) | | | | | |
| C5 | (1) | 2330 | 0.026 | 0.25 | 0.25 | 8.5 | 2.82 | 360 | 4950 |
| C6 | 1400 | 6 | 0.013 | 19.7 | 20.2 | 7.1 | 266 | 91 | 840 |

(1) control, no toughener
(2) LMWN-low molecular weight nylon
(3) % moisture for flow measurement
(4) PRODUCT-(GATE IZOD) (TENSILE STRENGTH) (FLOW)
(5) normal value 1.0

TABLE 6

COMPARISON OF TOUGHENED AND UNTOUGHENED EXAMPLES

| NUMBER | TOUGHENER NUMBER(S) | MATRIX NUMBER(S) | % LMWN (5) | MATRIX Mn | MATRIX IMBALANCE + CAPPED ENDS | END GROUP RATIO | GRAFT LEVEL % | SAXS nano meters |
|---|---|---|---|---|---|---|---|---|
| 43 | T4,13.0%/T3,10.1% T1,2.2% | H8,46.8% L11,28.0% | 28 | 3100 | 553 | 8.3 | 3.14 | 304 |
| C7 | (1) | H8,62.6% L11,37.4% | 37.4 | 3100 | 553 | 8.3 | (1) | (1) |
| 45 | T4,13.7%/T3,10.6% T1,2.3% | H8,49.4% L11,24.0% | 24 | 3500 | 512 | 7.1 | 4 | 318 |
| C8 | (1) | H8,67.3 L11,32.7% | 32.7 | 3500 | 512 | 7.1 | (1) | (1) |

| NUMBER | MAXIMUM TEM PARTICLE SIZE nanometers | FLOW gm/ 10 min | % water (3) | GATE IZOD ft lbs/in | FAR IZOD ft lbs/in | TENSILE STRENGTH Kpsi | ELON- GATION % | FLEXURAL MODULUS Kpsi | PRODUCT (4) |
|---|---|---|---|---|---|---|---|---|---|
| 43 | 1200 | 820 | 0.025 | 13.3 | 12.4 | 5.4 | 30 | 190 | 58900 |
| C7 | (1) | >4000 | | 0.25 | 0.25 | 4.9 | 1.3 | 365 | |
| 45 | 1000 | 800 | 0.009 | 13.2 | 13.4 | 5.3 | 37 | 196 | 55900 |
| C8 | (1) | >4000 | | 0.44 | 0.31 | 7.4 | 2.6 | 372 | |

(1) comparison, no toughener
(2) LMWN-low molecular weight nylon
(3) % moisture for flow measurement
(4) PRODUCT-(GATE IZOD) (TENSILE STRENGTH) (FLOW)

TABLE 7

PREPARATION METHODS AND MATERIAL CODES

| NUMBER | TOUGHENER NUMBER(S) | MATRIX NUMBER(S) | % STABILIZER (4) | CONCEN- TRATE EXT. TYPE | CONCEN- TRATE EXT. RPM | LMWN (5) ADDITION EXT. TYPE | LMWN (5) ADDITION EXT. RPM |
|---|---|---|---|---|---|---|---|
| 1 | T6,20% | H3,30% L1,50% | 0 | 28 mm | 300 | 30 mm | 377 |

TABLE 7-continued

| NUMBER | TOUGHENER NUMBER(S) | MATRIX NUMBER(S) | PREPARATION METHODS AND MATERIAL CODES | | | | |
|---|---|---|---|---|---|---|---|
| | | | % STABILIZER (4) | CONCENTRATE EXT. TYPE | CONCENTRATE EXT. RPM | LMWN (5) ADDITION EXT. TYPE | LMWN (5) ADDITION EXT. RPM |
| 2 | T2,20% | H3,30%/L1,50% | 0 | 28 mm | 300 | 28 mm | 286 |
| 3 | T2,20% | H3,30%/L1,50% | 0 | 28 mm | 300 | 28 mm | 284 |
| 4 | T3,16.8% | H5,43.2%/L2,40.0% | 0.216 | 83 mm | 290 | 28 mm | 284 |
| 5 | T3,16.8% | H5,43.2%/L3,40.0 | 0.216 | 83 mm | 290 | 28 mm | 284 |
| 6 | T3,16.8% | H5,43.2%/L3,40.0% | 0.5 | 83 mm | 290 | 28 mm | 286 |
| 7 | T3,21% | H5,54%/L4,25% | 0.5 | 83 mm | 290 | 30 mm | 377 |
| 8 | T3,22% | H5,58%/L4,20% | 0.5 | 83 mm | 290 | 30 mm | 377 |
| 9 | T3,21.0% | H5,54.0%/L4,25.0% | 0.5 | 28 mm | 286 | 28 mm | 286 |
| 10 | T3,21.0% | H5,54.0%/L4,25.0% | 0.5 | 83 mm | 290 | 28 mm | 286 |
| 11 | T3,22.4% | H5,57.4%/L4,20.0% | 0.5 | 83 mm | 290 | 28 mm | 286 |
| 12 | T3,19.6% | H5,50.4%/L4,30.0% | 0.5 | 83 mm | 290 | 28 mm | 286 |
| 13 | T3,18.2% | H5,46.8%/L16,35.0% | 0.5 | 83 mm | 290 | 28 mm | 286 |
| 14 | T3,19.6% | H5,50.4%/L4,30% | 0.5 | 83 mm | 290 | 28 mm | 285 |
| 15 | T7,26% | H3,39.0%/L16,35% | 0.5 | 28 mm | 286 | 28 mm | 285 |
| 16 | T7,26% | H3,39.0%/L16,35.0% | 0.5 | 28 mm | 240 | 28 mm | 285 |
| 17 | T3,22.0% | H3,24.0%/H1,12.0%/H4,12.0%/L4,30.0% | 0.5 | 28 mm | 286 | 28 mm | 285 |
| 18 | T3,23.8% | H5,61.2%/L5,15.0% | 0.5 | 83 mm | 290 | 28 mm | 280 |
| 19 | T3,23.0% | H5,59.0%/L5,18.0% | 0.5 | 83 mm | 290 | 28 mm | 280 |
| 20 | T3,26.0% | H6,31.0%/H1,31.0%/L5,12.0% | 0.31 | 28 mm | 280 | 28 mm | 280 |
| 21 | T3,26.0% | H4,31.0%/H1,31.0%/L5,12.0% | 0.31 | 28 mm | 284 | 28 mm | 280 |
| 22 | T3,18% | H5,47%/L6,35% | 0.5 | 83 mm | 290 | 30 mm | 400 |
| 23 | T3,26.0% | H1,31%/H4,31%/L5,12% | 0.5 | 28 mm | 284 | 28 mm | 280 |
| 24 | T3,25.0% | H4,29.0%/H1,29.0%/L5,18.0% | 0.5 | 28 mm | 280 | 28 mm | 284 |
| 25A | T3,26.0% | H4,31.0%/H1,31.0%/L5,12.0% | 0.5 | 28 mm | 284 | 28 mm | 284 |
| 25B | T3,26.0% | H4,31.0%/H1,31.0%/L5,12.0% | 0.5 | 28 mm | 284 | 28 mm | 284 |
| 26 | T3,25.5% | H1,59.5%/L5,15.0% | 0.5 | 28 mm | 284 | 28 mm | 284 |
| 27A | T3,24.6% | H5,63.4%/L5,12.0% | 0.5 | 83 mm | 290 | 28 mm | 280 |
| 27B | T3,24.6% | H5,63.4%/L5,12.0% | 0.5 | 83 mm | 290 | 28 mm | 280 |
| 27C | T3,24.6% | H5,63.4%/L5,12.0% | 0.5 | 83 mm | 290 | 28 mm | 280 |
| 28A | T4,19.0%/T1,4.7% | H8,55.3%/L9,21.0% | 0 | 28 mm | 284 | 28 mm | 284 |
| 28B | T4,19.0%/T1,4.7% | H8,55.3%/L9,21.0% | 0 | 28 mm | 284 | 28 mm | 284 |
| 28C | T4,19.0%/T1,4.7% | H8,55.3%/L9,21.0% | 0 | 28 mm | 284 | 28 mm | 284 |
| 29 | T3,22.5% | H4,26.3%/H3,26.3%/L7,25.0% | 0.5 | 28 mm | 284 | 28 mm | 284 |
| 30 | T3,22.5% | H5,52.5%/L7,25.0% | 0 | 28 mm | 284 | 28 mm | 284 |
| 31 | T3,25.5% | H3,29.8%/H1,29.8%/L8,15.0% | 0 | 28 mm | 284 | 28 mm | 284 |
| 32 | T3,22.5% | H8,52.5%/L7,25.0% | 0.5 | 28 mm | 284 | 28 mm | 284 |
| 33 | T4,20.4%/T1,5.1% | H8,59.5%/L9,15.0% | 0 | 28 mm | 284 | 28 mm | 284 |
| 34 | T4,19.0%/T1,4.7% | H8,55.3%/L9,21% | 0 | 28 mm | 284 | 28 mm | 284 |
| 35 | T4,23.8% | H8,59.5% | 0 | 28 mm | 284 | 28 mm | 284 |

TABLE 7-continued

| NUMBER | TOUGHENER NUMBER(S) | MATRIX NUMBER(S) | % STABILIZER (4) | CONCENTRATE EXT. TYPE | CONCENTRATE EXT. RPM | LMWN (5) ADDITION EXT. TYPE | LMWN (5) ADDITION EXT. RPM |
|---|---|---|---|---|---|---|---|
| 36 | T1,1.7% T3,25.5% | L9,15.0% H8,59.5% L10,15.0% | 0 | 28 mm | 284 | 28 mm | 284 |
| 37 | T4,23.0% T1,2.6% | H8,59.5% L10,15.0% | 0 | 28 mm | 284 | 28 mm | 284 |
| 38 | T4,23.8% T1,1.7% | H8,59.5% L10,15.0% | 0 | 28 mm | 284 | 28 mm | 284 |
| 39 | T4,20.4% T1,5.1% | H8,59.5% L10,15.0% | 0 | 28 mm | 284 | 28 mm | 284 |
| 40 | T7,18.2% | H8,53.2% L9,24.0% | 0 | 28 mm | 284 | 28 mm | 284 |
| 41 | T4,17.5% T1,4.4% | H8,51.1% L9,27.0% | 0 | 28 mm | 284 | 28 mm | 284 |
| 42 | T4,13.0%/T3,10.1% T1,2.2% | H8,46.8% L11,28% | 0 | 28 mm | 284 | 28 mm | 284 |
| 43 | T4,13.0%/T3,10.1% T1,2.2% | H8,46.8% L11,28.0% | 0 | 28 mm | 200 | 28 mm | 280 |
| 44 | T4,13.7%/T3,10.6% T1,2.2% | H8,49.4% L12,24.0% | 0 | 28 mm | 200 | 28 mm | 280 |
| 45 | T4,13.7%/T3,10.6% T1,2.3% | H8,49.4% L11,24.0% | 0 | 28 mm | 200 | 28 mm | 284 |
| 46 | T4,14.2%/T3,11.1% T1,2.4% | H8,51.4% L13,21.0% | 0 | 28 mm | 284 | 28 mm | 284 |
| 47 | T4,13.7%/T3,10.6% T1,2.3% | H8,49.4% L11,24.0% | 0 | 28 mm | 284 | 28 mm | 284 |
| 48 | T4,14.2%/T3,11.1% T1,2.4% | H8,51.4% L13,21.0% | 0 | 28 mm | 284 | 28 mm | 284 |
| 49 | T4,13.7%/T3,10.6% T1,2.2% | H7,33.1%/H3,16.3% L10,24.0% | 0 | 28 mm | 200 | 28 mm | 280 |
| 50 | T3,26.6% | H7,33.1%/H3,16.3% L11,24.0% | 0 | 28 mm | 280 | 28 mm | 284 |
| 51 | T4,13.7%/T3,10.6% T1,2.3% | H7,37.0%/H3,12.4% L11,24.0% | 0 | 28 mm | 280 | 28 mm | 284 |
| 52 | T4,13.7%/T3,10.6% T1,2.3% | H7,39.5%/H3,9.9% L11,24.0% | 0 | 28 mm | 280 | 28 mm | 284 |
| 53 | T4,13.7%/T3,10.6% T1,2.3% | H7,33.1%/H3,16.3% L11,24.0% | 0 | 28 mm | 280 | 28 mm | 284 |
| 54 | T4,13.7%/T3,10.6% T1,2.3% | H3,34.2%/H9,15.2% L14,24.0% | 0 | 28 mm | 284 | 28 mm | 284 |
| 55 | T7,25.4% | H1,29.65%/H3,29.65% L12,15.3% | 0 | 28 mm | 280 | 28 mm | 280 |
| 56 | T3,25% | H1,30%/H3,30% L15,15% | 0 | 30 mm 1 step | 300 1 step | | |
| 57 | T3,23.5% | H5,60.5% L15,16.0% | 0 | 83 mm | 290 | 2' single screw | 30 |
| 58 | T3,23.5% | H5,60.5% L15,16.0% | 0 | 83 mm | 290 | 2' single screw | 60 |
| 59 | T3,23.8% | H5,61.2% l8,15.0% | 0 | 83 mm | 290 | (2) | |
| C1 | T3,16.8% | H5,43.2% H1,40.0% | 0 | 83 mm | 290 | 28 mm | 286 |
| C2 | T3,16.8% | H5,43.2% H2,40.0% | 0 | 83 mm | 290 | 28 mm | 286 |
| C3 | T4,10.0% T1,9.0% | H1,81.0% | 0 | 28 mm | 200 | | |
| C4 | (3) | H1,100.0% | 0 | 28 mm | 200 | | |
| C5 | (3) | H8,71% L11,29% | 0 | | | 28 mm | 284 |
| C6 | T3,28% | H5,72% | 0 | 83 mm | 290 | | |
| C7 | (3) | H8,62.6% L11,37.4% | 0 | | | 28 mm | 280 |
| C8 | (3) | H8,67.3 L11,32.7% | 0 | | | 28 mm | 280 |

(1) extruded with 0.75% water + 0.15% phenylphosphinic acid added
(2) unextruded, dry blended and molded
(3) control, no toughener
(4) stabilizer-KI/CuI/aluminum distearate-7/1/0.5
(5) LMWN-low molecular weight nylon

I claim:
1. A multiphase thermoplastic blend comprising:
a) 60–90 wt. % of a polyamide matrix wherein at least 50% of the polyamide matrix by weight is composed of aliphatic moieties, wherein the number average molecular weight of the polyamide(s) in the matrix is between 3,000 and 8,000, wherein the polyamide matrix is comprised of polyamide molecules having end groups selected from amine groups, carboxyl groups and capped groups, wherein the difference between the quantity of amine groups and the quantity of carboxyl groups is the imbalance, wherein the total quantity of the capped groups is the capped ends, wherein the ratio of the quantity of the amino groups to the quantity of the carboxyl groups or the ratio of the quantity of the carboxyl groups to the quantity of the amine groups, whichever is larger, is the end group ratio, and further wherein the polyamide matrix is characterized by
1) a total quantity of imbalance plus capped ends of at least 200 equivalents per $10^6$ grams of polyamide, or
2) an end group ratio of at least 1:9 and a total quantity of imbalance plus capped ends of at least 100 equivalents per $10^6$ grams of polyamide and b) complementally, 10-40 wt. % of at least one organic polymer toughener having a tensile modulus below 10,000 psi or for a mixture of tougheners an average modulus below 10,000, and having a number average particle size less than about 1,000 nanometers, and wherein the blend has a notched Izod of over 2 ft. lbs/inch, and a melt flow greater than 200 gm per 10 minutes, and also has a tensile strength and melt flow such that the product of notched Izod in ft. lb/inch, tensile strength in thousands of pounds/$in^2$ and flow in grams/10 minutes is greater than 5,000, and has 0.5-15 weight % of the polyamide matrix grafted to or entrapped in the toughener.

2. A multiphase thermoplastic blend comprising:
a) 60-90 wt. % of a polyamide matrix wherein at least 50% of the polyamide matrix by weight is composed of aliphatic moieties, wherein the number average molecular weight of the polyamide(s) in the matrix is between 3,000 and 8,000 and
b) complementally, 10-40 wt. % of at least one organic polymer toughener having a tensile modulus below 10,000 psi or for a mixture of tougheners an average modulus below 10,000, and having a number average particle size less than about 1,000 nanometers, and wherein the blend has a notched Izod of over 2 ft. lbs./inch, and a melt flow greater than 200 gm per 10 minutes, and also has a tensile strength and melt flow such that the product of notched Izod in ft. lb./inch, tensile strength in thousands of pounds/in2 and flow in grams/10 minutes is greater than 5,000, and has 0.5-15 weight % of the polyamide matrix grafted to or entrapped in the toughener, which blend has been made by a process comprising:
1) mixing a high molecular weight polyamide or mixture of polyamides, having a number average molecular weight over 10,000 and having an inherent viscosity greater than 0.7 deciliters/gm, with an organic polymeric toughener having a tensile modulus below 10,000 or a mixture of tougheners having an average tensile modulus below 10,000, and having graft sites selected from metal neutralized carboxyl, adjacent dicarboxyl, anhydride or epoxy groups in a melt extruder at shear forces sufficient to disperse the toughener in the polyamide at toughener maximum to number average particle size below about 1,000 nanometers measured by Transmission Electron Microscope (TEM); and
2) blending into the blend obtained in step 1), a low molecular weight polyamide which will react by transamidation having a number average molecular weight below 5,000, an having an inherent viscosity less than 0.5, said polyamide being chosen to have a sufficiently low molecular weight to result, after reaction with the polyamide in step 1), in a polyamide matrix wherein the number average molecular weight is below 8,000.

3. The blend of claim 1 or 2 wherein the polyamide matrix is at least 75% aliphatic by weight.

4. The blend of claim 1 or 2 wherein the polyamide matrix is composed of entirely aliphatic polyamides.

5. The blend of claim 1 or 2 wherein the polyamide matrix is substantially 6 nylon.

6. The blend of claim 1 or 2 wherein the polyamide matrix is 15 to 30% 6 nylon and 85 to 70% 66 nylon.

7. The blend of claim 1 or 2 wherein the weight percent of the polyamide matrix grafted to or entrapped in the toughener is between 1 and 7 weight percent.

8. The blend of claim 1 or 2 wherein the toughener is a polymer of ethylene, at least one alpha-olefin of 3 to 6 carbon atoms, and at least one unsaturated monomer taken from the class consisting of branched, straight chain and cyclic hydrocarbon compounds having from 4 to 14 carbon atoms and said unsaturated monomer having at least one additional nonconjugated unsaturated carbon-carbon bond, in which said polymer has grafted thereto an unsaturated monomer taken from the class consisting of
(a) alpha, beta-ethylenically unsaturated dicarboxylic acids having from 3 to 10 carbon atoms.
(b) monoesterified esters of such acids where the alcohol moiety contains 1 to 29 carbon atoms,
(c) anhydrides of dicarboxylic acids covered in (a), and
(d) dicarboxylic acids and the monoesters of said dicarboxylic acid covered in (a) and (b) having at least a portion of the carboxylic groups ionized by neturalization with metal ions.

9. The blend of claim 1 or 2 where the polymer toughener is a copolymer of ethylene, propylene, and 1,4-hexadiene and, optionally, norbonadiene, monomers selected from the group consisting of
i) ethylene, propylene and 1,4-hexadiene, and
ii) ethylene, propylene, 1,4-hexadiene and norbornadiene;
said copolymer having grafted thereto an unsaturated monomer taken from the class consisting of fumaric acid, maleic acid and maleic anhydride.

10. The blend of claim 1 or 2 wherein the toughener is a copolymer of ethylene, methyl or ethyl acrylate, and from about 0.0025-0.077 mole/100 g polymer of a mono alkyl ester of 1,4-butenedioic acid in which the alkyl group of the ester has 1 to 6 carbon atoms and having 0 to 100 percent of the esters of 1,4-butenedioic acid ionized by neutralization with metal ions selected from lithium, sodium, potassium, calcium and zinc ions.

11. The blend of claim 1 or 2 wherein the toughener is an ionic copolymer of units derived from alpha-olefin having the formula $RCH=CH_2$ wherein R is H or alkyl having from 1 to 8 carbon atoms and from 0.2 to 25 mole percent of units derived from an alpha,beta-ethylenically unsaturated mono- or dicarboxylic acid, at least 10% of the acid groups of said units being neutralized by metal ions having a valence of from 1 to 3, inclusive.

12. The blend of claim 1 or 2 wherein the toughener is an organic polymer which contains graft sites and sufficient alkyl acrylate, butadiene or substituted butadiene, isoprene, isobutylene, or other rubber producing monomers to achieve the desired modulus.

13. The blend of claim 1, or 2 where the product of notched Izod in ft. lb./in., tensile strength in thousands of pounds in/$^2$ and flow in grams/10 minutes is greater than 10,000.

14. The blend of claim 1 or 2 wherein the number average particle size of the organic toughener is less than about 500 nanometers.

15. The blend of claim 1 or 2 wherein the tensile modulus of the toughener is below 3,000 psi.

16. The blend of claim 1 which additionally contains a reinforcing filler.

17. The blend of claim 16 where the reinforcing filler is glass fiber.

18. The blend of claim 14 which additionally contains a reinforcing filler.

19. The blend of claim 18 where the reinforcing filler is glass fiber.

* * * * *

UNITED STATES PATENT AND TRADEMARK OFFICE
CERTIFICATE OF CORRECTION

PATENT NO. : 5,112,908

DATED : May 12, 1992

INVENTOR(S) : Bennett Noah Epstein

It is certified that error appears in the above-identified patent and that said Letters Patent is hereby corrected as shown below:

Column 29, line 4, delete "amino" and insert --amine-- in place thereof.

Signed and Sealed this

Twenty-second Day of March, 1994

Attest:

BRUCE LEHMAN

Attesting Officer

Commissioner of Patents and Trademarks